United States Patent
Souel et al.

(10) Patent No.: US 6,281,468 B1
(45) Date of Patent: Aug. 28, 2001

(54) METHOD AND APPARATUS FOR PRODUCING A MARKING ON AN OPHTHALMIC LENS HAVING A LOW SURFACE ENERGY

(75) Inventors: Thierry Souel, Ligny en Barrois (FR); Edward de Rojas, Grapevine, TX (US)

(73) Assignee: Essilor International, Compagnie Generale d'Optique, Charenton (FR)

( * ) Notice: Subject to any disclaimer, the term of this patent is extended or adjusted under 35 U.S.C. 154(b) by 0 days.

(21) Appl. No.: 09/524,559

(22) Filed: Mar. 13, 2000

(51) Int. Cl.[7] ............................. B05D 5/06; B01J 19/08; G02C 7/02
(52) U.S. Cl. ....................... 219/121.11; 351/159
(58) Field of Search ................. 219/121.11, 121.69, 219/121.39; 351/159, 163, 165

(56) References Cited

U.S. PATENT DOCUMENTS

| | | | |
|---|---|---|---|
| 3,657,085 | * | 4/1972 | Hoffmeister et al. . |
| 3,879,183 | * | 4/1975 | Carlson . |
| 4,145,125 | * | 3/1979 | Chika .................................... 351/165 |
| 4,898,459 | * | 2/1990 | Eriksson . |
| 4,912,298 | * | 3/1990 | Daniels et al. .................. 219/121.69 |
| 5,484,467 | * | 1/1996 | Nass et al. . |

\* cited by examiner

Primary Examiner—Geoffrey S. Evans
(74) Attorney, Agent, or Firm—Young & Thompson

(57) ABSTRACT

An apparatus and method for producing a relatively high surface energizing on an ophthalmic lens by, applying a mask defining a reverse image of a desired marking to the surface of the ophthalmic lens to be marked, using a surface energizing source to provide a discharge to cause fogging to render a visible marking on the lens. The surface energizing source can be a corona discharge source.

19 Claims, 2 Drawing Sheets

METHOD AND APPARATUS FOR PRODUCING A MARKING ON AN OPHTHALMIC LENS HAVING A LOW SURFACE ENERGY

The present invention relates to the marking of ophthalmic lenses and in particular spectacle lenses, for the purpose of identifying the manufacturer, origin or characteristics of the lens. Such marking is commonly referred to as "monogramming".

BACKGROUND OF THE INVENTION

There are a wide variety of methods of marking ophthalmic lenses. Some involve the selective removal of the ophthalmic lens material and/or coatings thereon, namely by mechanical engraving and etching and by means of lasers and excimers. Such markings are generally visible to the naked eye with or without special lighting conditions and may be colored with pigments for enhanced visibility. Eyeglass wearers have objected to such permanent markings which can be seen when the eyeglasses are worn. The same holds for colored transfer and photochromic markings in or on the body of the lens material.

Other kinds of markings are normally invisible but can been rendered visible by fogging the lens, in practice, simply by exhaling against the lens to produce a thin layer of condensation. Essentially such methods involve the change in the surface characteristics of the lenses. Some known coatings have high surface energies such as anti-reflective coatings. Others, such as top coats used as anti-smudge coatings to avoid dust and grime collecting on the lens have low surface energies. Typically the high or low surface energy material is selectively chemically modified or even removed to the configuration of the indicia desired. Fogging reveals the low surface energy parts as light colored droplets and the high surface energy parts as darker colored condensate film.

Danielos et al. U.S. Pat. No. 4,912,298 discloses a method of producing a marking on a spectacle lens by irradiation of defined regions of the spectacle lens with a high energy excimer laser through a suitably cutout metal mask spaced from or on the lens which vaporizes a thin layer (0.1 $\mu$m) of a lens so that the marking is recognizable as a breath mark.

In European patent application No. 0 031 633 indicia are provided on a lens surface of a polycarbonate lens by applying concentrated sulfuric acid by means of a printing block, pencil or brush to increase the surface energy of the marked portion and visible when fogged with one's breath. Such a method does not admit of precise delineation of the marked portion and also requires careful washing and drying.

French patent application publication No. 2,727,649 discloses a method of marking eyeglass lenses of organic material with or without antiscratch coating or metallic reflective coatings. This method involves subjecting the face of the lens to be marked to a corona discharge, a flame or ionized air in order to increase the surface energy and thereby improve adherence of the surface to be marked. The actual marking is produced by pad transfer or silk screening printing with a special marking ink comprising an ink and an anti-fogging agent, which is then dried and thereafter the ink component is removed with an appropriate solvent.

European patent No. 0.472.303 concerns a hydrophobic contact lens casting mold, e.g. of polyolefin, which is subject to a hydrophilizing treatment, namely by means of an electrical corona discharge to enhance the adhesion of a hydrophilic monomer coloring dispersion without interference with the release properties of the mold.

OBJECT AND SUMMARY OF THE INVENTION

The object of the present invention is to provide a simplified method and apparatus for providing a high surface energy marking of an ophthalmic lens surface having a low surface energy which is rendered visible by fogging.

According to one aspect of the invention, there is provided an apparatus and related method for producing a relatively high surface energy marking on a surface of an ophthalmic lens having low surface energy. The apparatus comprises a surface energizing source, means for applying a mask on a surface of an ophthalmic lens to be marked, the mask defining a reverse image of a desired marking, means for positioning the surface of the lens to be marked facing the surface energizing source with the mask interposed between the surface energizing source and the surface of the lens to be marked, the energizing discharge of the energizing source increasing the surface energy of the surface to be marked so as to render the resulting marking visible by fogging.

According to one preferred embodiment of the invention, the mask is a part of a flexible screen which is impermeable to the surface energizing discharge and has a cutout corresponding to the reverse image of the desired marking. The mask part of the screen mates with the lens surface to be marked when the lens is pressed against the screen held taut. With such an embodiment, the selective modification of the surface energy is effectively a single step treatment of the lens, eliminating one or more steps heretofore necessary, before and/or after.

According to another preferred embodiment, an ink mask is stamped directly on the surface of the lens. The mask is impermeable to the surface energizing discharge. The ink mask on the lens is brought in position facing the surface energizing source. After treatment, the ink mask on the lens is removed, e.g. with a suitable solvent. The application of an ink mask permits a very sharp and precise marking and also a virtually infinite variety of markings since it is not dependent on the mechanical characteristics of a cutout screen mask. Moreover, an ink mask permits the concave as well as the convex surfaces of the lens to be marked.

The energizing source described above is a corona discharge source. Although a corona discharge source is preferred, other energizing sources may be used, namely ultraviolet radiation sources or glow discharge sources and low temperature plasma sources.

These and other features of the present invention will be brought out in the description which follows, by way of example with reference to the accompanying drawings.

DESCRIPTION OF THE PREFERRED EMBODIMENTS

Figure 1:
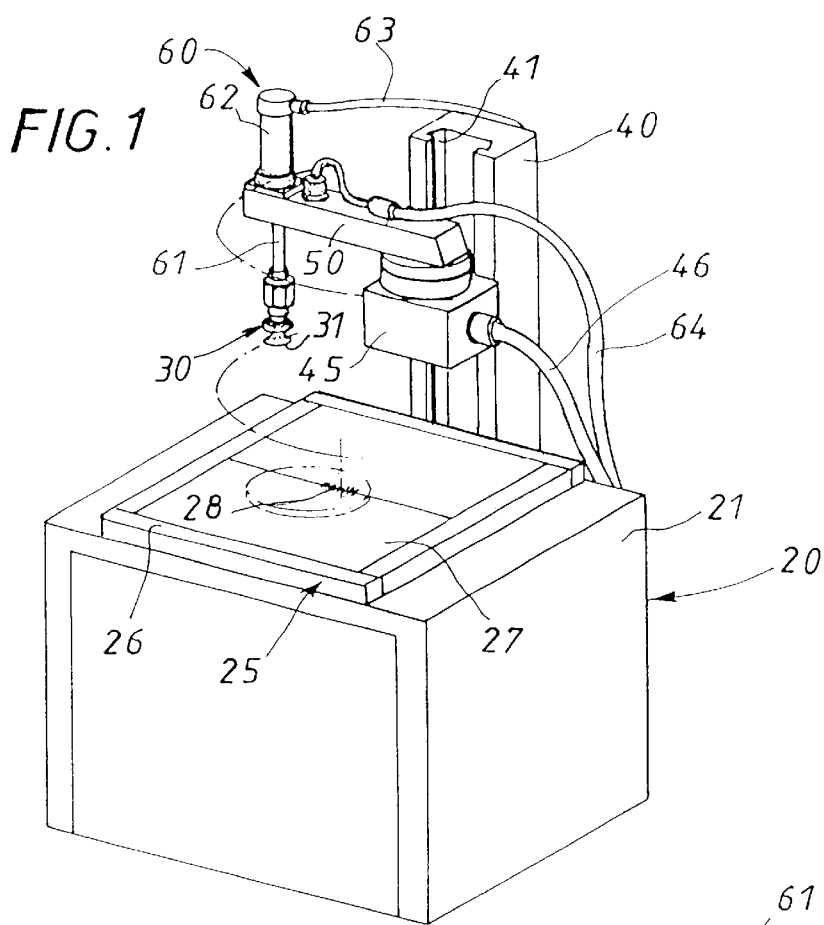
FIG. 1 is a perspective view of an apparatus for marking an ophthalmic lens surface according to the present invention.
Figure 2:
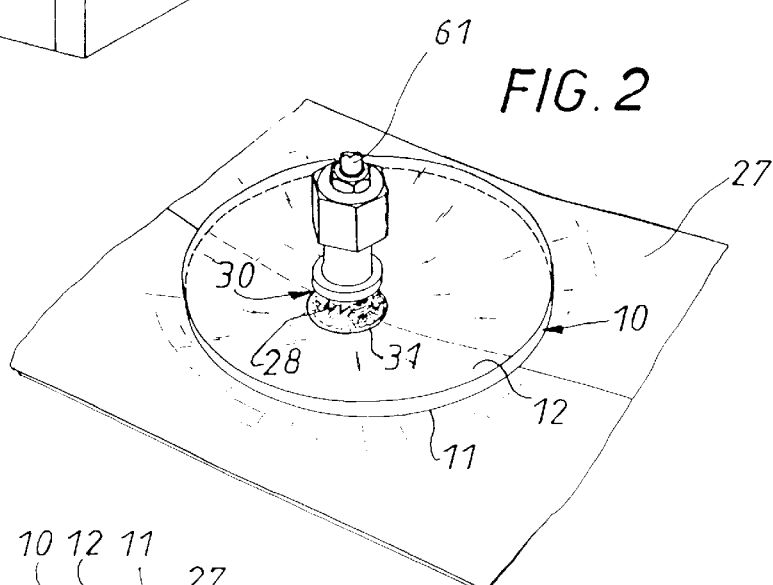
FIG. 2 is a detailed viewed on a larger scale showing the ophthalmic lens in position, in mating contact with the mask for selective corona discharge treatment.

FIG. 1 illustrates an apparatus 20 for producing a normally invisible marking on a face 11 of an ophthalmic lens 10 according to a first embodiment.

Typically such a face may be a low surface energy surface such as a hydrophobic anti-smudge top coat, in particular the CRIZAL® top coat of the Assignee of the present application. The low surface energy top coat is, for example, provided on the convex front face of the lens 10. The bulk ophthalmic lens material may be any suitable resin, in particular polycarbonate, or alternatively mineral glass. At least the convex face of the bulk material of a polycarbonate lens typically receives a high surface energy hard coat for protecting the polycarbonate from scratching, as is known per se. The hard coat may in turn be coated with an high surface energy anti-reflective coat, also known per se. The present invention is suitable for any ophthalmic lens bulk material which has a relatively low surface energy or any ophthalmic lens with a relatively low surface energy coat such as a top coat which may cover a high surface energy intermediate coat, such as an anti-reflective coat or a hard coat or directly overlie bulk material of the lens having a high or a low surface energy.

In practice, such a hard coat has a thickness between 1 and 8 or 11 $\mu$m, the anti-reflective coat between 0.1 and 0.5 $\mu$m and the anti-smudge top coat between 1 and 10 nm.

According to this preferred embodiment, the apparatus 20 has a generally rectangular lower enclosure 21 which houses a surface energizing source, namely a corona discharge unit.

The corona discharge unit may be a Tantec 650 W, low frequency (e.g. 50 or 60 Hz) corona treatment unit having a discharge head 29 with a pair of electrodes providing a corona discharge of 1500 volts. Though low frequencies are preferred for reasons of safety, higher frequencies, e.g. 2,000 Hz, will provide good results.

In operation of the corona discharge unit, a low frequency high voltage is applied across the electrodes which accelerates electrons in the airgap and ionizes the air gap, causing electron avalanching. The resulting high energy field is capable of breaking the molecular bonds, e.g. of a hydrophobic top coat, to increase the surface energy of the material or even disintegrate the coat, in which case it reveals the subjacent, high surface energy coat or substrate.

On top of the lower enclosure 21 is a screen sub-assembly 25 overlying the corona discharge head 29. The screen sub-assembly has a rectangular frame 26 which holds the screen 27 taut for example under a tension of about 1 kg. The screen material is preferably a suitably polymer film impermeable to the field produced by the corona discharge. The screen material has a cutout mask part 28 corresponding to the reverse image of the marking to be produced on the lens surface.

The screen material must be sufficiently flexible to mate intimately with the convex face 11 of the lens. The selectively permeable mask part is substantially dimensionally stable, so that when applied against the convex face, the mask 28 is not deformed. Finally, the screen material must be thin enough (e.g. 0.05 mm) to permit accurate cutting and intimate mating to avoid ripples which would otherwise produce leakage at the interface. Preferably, the mask is cut out in the screen material with an excimer laser.

It has been found that a Mylar® screen of several hundredths of a millimeter is the most suitable available material and satisfies the foregoing desiderata even though its flexibility is limited. A Mylar® screen may be cut out with an excimer laser to the desired tolerances. Also, such a Mylar® film may be held taut in the frame 26 at a tension of about 1 kg.

Alternatively, the screen sub-assembly may comprise an impregnated polymer screen fabric with an aperture generally in line with the corona discharge head. In this case, a preferably Mylar® sheet of small dimensions is affixed to the impregnated screen fabric and extends over the entire aperture in the screen. The Mylar® sheet will define a mask part as in the preferred embodiment. When the ophthalmic lens is lowered to the treatment position, the convex face of the lens comes into intimate mating contact with the mask part of the screen.

The apparatus 20 further comprises a fixed upright support 40 which is located to the rear of the lower enclosure 21 and extends well above the level of the screen sub-assembly 25. The upright support has a vertical slideway 41 which receives a complementarily shaped (e.g. dovetail) portion (not shown) of a slide member 45 to be adjustably positioned at the desired height above screen 27.

The slide member 45 mounts a proximal end of an arm 50 for angular movement in a generally horizontal plane as indicated in phantom line. In practice, the angular movement is between a lens pick-up position which may, for example, be to the left and rear of the screen, to a treatment position, at right angles and in alignment with the mask part 28 of the screen and to a drop-off position which may be at the same location as the pick-up position or at some other location, for example to the other side or the rear of the screen.

A pneumatic actuator 60 is mounted at the distal end of arm 50. The actuator rod 61 is arranged for reciprocal movement relative to an actuator cylinder 62 between raised and lowered positions, as shown.

A lens holding means 30 is mounted on the free lower end of the actuator rod 61 and comprises, in practice, a suction cup 31 having an annular lip cooperable with the concave face 12 of the ophthalmic lens.

The lens positioning means including the slide member 45, the arm 50 and the actuator 61, is preferably pneumatically, or hydraulically, controlled by a suitable control system, the features of which are outside the present invention.

Suffice it to say that air line 46 is connected to the slide member 45 and controls the angular position of arm between the pick-up, treatment and drop-off locations.

Line 63 connected to pneumatic actuator 60 controls the height of the suction cup 31 at the pick-up, treatment and drop-off positions and in the course of the swinging of the arm 50 between those positions.

Finally, line 64 is connected to hollow axial passage 61A extending through the actuator rod 61 for communication at the suction cup 31 with a source of partial vacuum (not shown) for selectively securely holding the lens on the suction cup and releasing the lens when the arm and suction cup are brought to the drop-off position.

In operation, the arm 50 is first swung to the pick-up position, the suction cup 31 being located at a level above the screen 27 and the next lens to be treated. When the arm reaches the pick-up position, the actuator rod 61 and suction cup 31 are lowered to bring the suction cup into contact with the lens to be treated, then the suction is applied to hold the lens on the suction cup.

The lens will in practice be previously precisely located at the pick-up station and thereby on the suction cup. State of the art means, such as a lensometer may be used for that purpose.

The suction cup 31 is thereafter raised and the arm 50 is swung to the treatment location where the actuator rod 61, suction cup 31 and lens 10 are lowered so that the lens is in desired location relative to the mask part 28 of the screen 27. The center of the convex surface 11 of lens 10 is lowered to a level below that defined by the screen in its rest position, such that the mask part 28 mates intimately with the corresponding area of the convex surface 11 of the lens. In practice, head pressure of about 0.9 kg is applied for this purpose.

Figure 3:
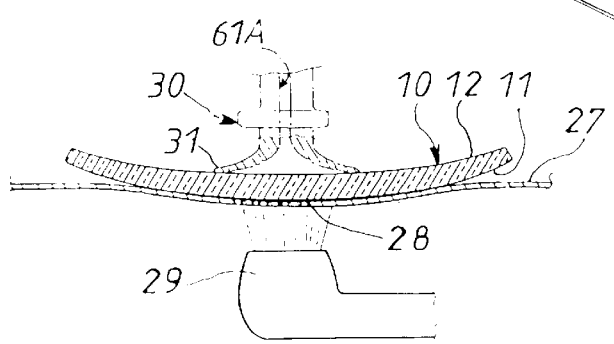
FIG. 3 is an axial cross section of the detailed view of FIG. 2.

Once the lens surface to be marked reaches the position shown in FIG. 3, the corona discharge unit is, preferably automatically, turned on, producing a field in direct communication with the mask part, thereby breaking the molecular bonds of the top coat to modify (i.e. increase) the surface energy of the exposed surfaces of the lens or even reveal an underlying high energy coat or substrate.

In practice, the corona discharge is applied for 1 to 10 seconds, and preferably 5 to 10 seconds, which has been found suitable for sufficiently modifying the surface energy of the top coat. It is noted that partial removal of the subjacent coat or substrate material may be tolerated as it does not affect the optical properties of the lens.

After treatment, the actuator rod, suction cup and lens are raised and the arm is swung to its drop-off position which may coincide with the pickup position or for example be located to the opposite side and rear of the screen. The actuator rod 62 is then lowered and the suction applied to the cup is stopped and the lens 10 released to the drop-off location. In practice, the lens is then placed in an envelope for shipment.

Figure 4:
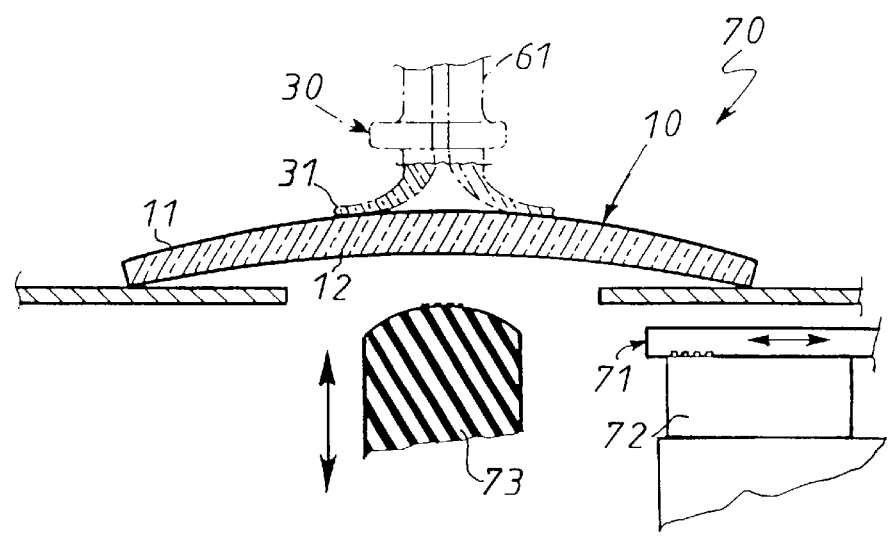
FIGS. 4 and 5 are also axial cross sections, for an alternative embodiment, showing a stamping station and the corona discharge treatment of a lens with an ink mask.
Figure 5:
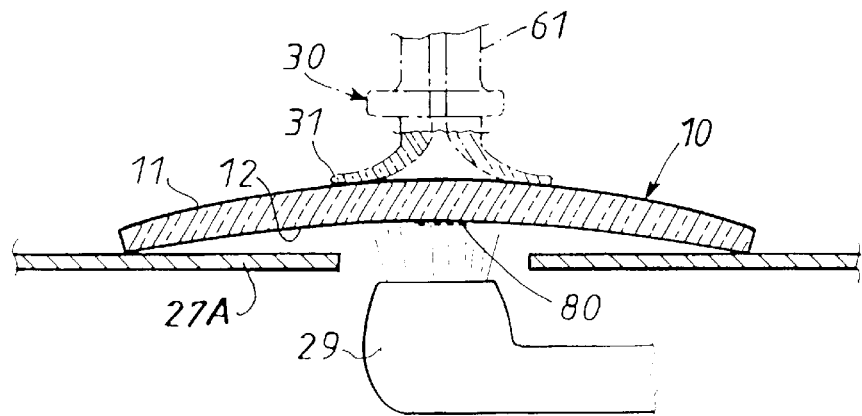

According to another preferred embodiment schematically illustrated in FIGS. 4 and 5, the mask is not part of the screen but rather is an ink mask 80 stamped directly on the lens surface to be marked. The application of the ink mask on the lens held by the suction cup 31 is effected at a stamping station 70, upstream from the pick-up position schematically illustrated in FIG. 4. The stamping station 70 preferably includes an ink plate 71 supplied with ink from an associated ink pot 72 and an ink pad 73. Prior to stamping, the reciprocating ink pad 73 is brought into engagement with the ink plate arranged for translatory movement to pick up ink. The face of the ink pad has a reverse image of the desired marking "engraved" therein. After inking, the pad 73 is brought into contact with the concave surface 11 of the lens to be stamped, or alternatively convex surface, in which case the lens would be oriented convex side down. The ink pad may be made of any suitable material. An ink pad of Shore hardness 8, ref. 4070, manufactured by Equipements Moreau may be advantageously used.

The stamping station 70 may incoporate an MD 80GF model stamping unit manufactured by Morlock.

After applying the ink mask 80 to the lens, the ink may be dried and/or polymerized. Any suitable drying or polymerization means may be used for such purpose, such as ultraviolet lamp.

After drying or polymerization, the ink masked lens 10 is transferred by the arm 50 and suction cup 31 to the pick-up position as described above and then treatment location facing the corona discharge head. In this embodiment, the enclosure top wall 27A does not define the mask but rather has a suitable opening of appropriate dimensions aligned with the corona discharge head 29. The lens is suitably supported on or above the enclosure top wall or with its concave side facing the enclosure top wall when that side is to be marked, or the opposite convex side. It goes without saying that the position of the actuator rod 61 will be adjusted depending whether the concave or convex surface of the lens is to be marked to ensure the desired distance between the discharge head and the lens surface to be marked.

After application of the corona discharge, the marked lens is taken by the lens positioning means to a cleaning station (not shown) where the ink mask is removed from the lens surface. The cleaning station may be part of the apparatus for producing the marking. Alternatively, the ink mask may be removed and the lens cleaned subsequently by an optician. Such an ink mask ensures very precise delineation of the desired marking in addition to being suitable for marking both the concave and the convex surfaces of the lens.

Accordingly to the preferred embodiments of the invention, the surface energizing source is a corona discharge source. Other surface energizing sources may be used, such as a so-called cold plasma source or a ultraviolet radiation source.

Such a cold plasma source may comprise an electric or microwave discharge or a glow discharge source. An electric or microwave source will produce a discharge into a gas such as oxygen, argon, nitrogen, carbon tetrafluoride, helium, ammonia at reduced pressures of the order of one millibar. The duration of the discharge may range from several tens of seconds to several minutes and will typically be in the range of 1–2 minutes. A suitable cold plasma source is manufactured by Atea and sold under the trademark Matis. Likewise, it is possible to use a Lectro Treat atmospheric pressure cold plasma source which produces a hybrid corona.

An ultraviolet radiation source will produce photo-oxidation of the molecules of the irradiated surface. These molecules are excited and/or dissociated by the absorption of such short wavelength radiation. Molecular dissociation is obtained with wavelengths in the ranges of 2357Å° and 1849Å°. Ultraviolet radiation treatment may be carried at atmospheric or low pressure for a duration ranging from several seconds to several minutes. A Uvocs unit for decontaminating surfaces may be used as an ultraviolet radiation source for the present invention.

It would be appreciated that these and other modifications and variants of the method and apparatus may be adopted without departing from the spirit and scope of the invention defined by the appended claims.

What is claimed is:

1. Apparatus for producing a relatively high surface energy marking on a surface of an ophthalmic lens having low energy surface, comprising a surface energizing source providing a discharge, means for applying a mask on a surface of an ophthalmic lens to be marked, the mask defining a reverse image of a desired marking, means for positioning the surface of the lens to be marked facing the surface energizing source with the mask interposed between the surface energizing source and the surface of the lens to be marked, whereby the energizing discharge is directed toward the low surface energy of the surface to be marked to increase the surface energy and render the resulting marking visible by fogging.

2. Apparatus according to claim 1, wherein the surface energizing source is an ozone generating device.

3. Apparatus according to claim 2, wherein said ozone generating source is a corona discharge source.

4. Apparatus according to claim 1, wherein the mask is part of a flexible screen impermeable to the surface energizing source and having a cutout corresponding to the reverse image of the desired marking, said mask part of said flexible screen being matable with the lens surface to be marked.

5. Apparatus according to claim 4, wherein an ophthalmic lens pickup zone is located spaced from said screen, said lens locating means further comprising an arm mounted for movement between the pick-up position and a marking position located on the screen, said lens holding means being carried on the arm for movement therewith between the pickup and marking positions.

6. Apparatus according to claim 1, wherein the means for locating an ophthalmic lens comprises lens holding means for selectively picking up and releasing an ophthalmic lens.

7. Apparatus according to claim 6, wherein said arm is also mounted for movement to and from a drop-off position for dropping off a marked ophthalmic lens at a position spaced from the screen.

8. Apparatus according to claim 1, wherein said screen comprises a plurality of mask parts.

9. Apparatus according to claim 1, wherein the ophthalmic lens low energy surface is defined by a thin coating on the bulk material of the lens or an underlying coating, said surface energizing source being operated on selected portions of the thin coating to reveal underlying higher surface energy material.

10. Apparatus according to claim 1, wherein the means for applying the mask comprises an inked printing block for stamping a reverse image of the desired marking on the surface of the ophthalmic lens to be marked.

11. Apparatus according to claim 10, further comprising means for removing the inked masked from the ophthalmic lenses after the application of the surface energizing treatment.

12. Method for producing a high surface energy marking on a surface of an ophthalmic lens having a low surface energy, comprising the steps of providing a surface energizing source, applying a mask to the surface of the ophthalmic lens to be marked defining a reverse image of the desired marking and positioning the ophthalmic lens facing the surface energizing source with the mask interposed between the ophthalmic lens and the surface energizing source, and effecting surface energization sufficient to increase the surface energy so that the resulting marking is visible by fogging the lens.

13. Method according to claim 12, wherein the mask is defined by portion of a flexible film screen having a cutout defining the reverse image of the desired marking.

14. Method according to claim 13, further comprising picking up the ophthalmic lens to be marked at a pickup station spaced from the screen and transferring the ophthalmic lens to the screen and removing the ophthalmic lens from screen after marking and transferring the ophthalmic lens to a drop-off area spaced from the screen.

15. Method according to claim 12, wherein the surface source is a corona discharge source and the duration of the corona discharge is about 5 to 10 seconds.

16. Method according to claim 12, wherein the surface energizing source is an ozone generating source selected from the group consisting of corona discharge sources, ultraviolet radiation sources, and glow discharge sources.

17. Method according to claim 12, wherein the surface energizing source is selected from the group consisting of corona discharge sources, ultraviolet radiation sources, glow discharge sources and low temperature plasma sources.

18. Method according to claim 12, wherein the low surface energy surface of the ophthalmic lens is defined by thin coating, said corona discharge being of sufficient duration to eliminate selected portions of the coating so as to reveal underlying high surface energy material.

19. Method according to claim 12, wherein the mask is an ink mask stamped on the surface of the ophthalmic lens to be marked, and removed from the lens after surface energizing treatment.

* * * * *